United States Patent
Collins et al.

(10) Patent No.: US 9,135,089 B2
(45) Date of Patent: Sep. 15, 2015

(54) METHOD AND APPARATUS FOR FACILITATING A PERSISTENCE APPLICATION PROGRAMMING INTERFACE

(75) Inventors: Jeffrey M. Collins, San Mateo, CA (US); Calum Murray, Santa Rosa, CA (US); Robert A. Luben, Fremont, CA (US); James Lee Showalter, Los Gatos, CA (US); Raymond J. Chapman, San Jose, CA (US)

(73) Assignee: INTUIT INC., Mountain View, CA (US)

( * ) Notice: Subject to any disclaimer, the term of this patent is extended or adjusted under 35 U.S.C. 154(b) by 1304 days.

(21) Appl. No.: 12/249,429

(22) Filed: Oct. 10, 2008

(65) Prior Publication Data
US 2010/0095311 A1 Apr. 15, 2010

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/54* | (2006.01) |
| *H04L 29/08* | (2006.01) |

(52) U.S. Cl.
CPC .............. *G06F 9/541* (2013.01); *H04L 67/02* (2013.01); *H04L 67/28* (2013.01); *G06F 2209/542* (2013.01)

(58) Field of Classification Search
CPC ...................................................... G06F 9/541
USPC ........................................................ 719/328
See application file for complete search history.

(56) References Cited

U.S. PATENT DOCUMENTS

| | | | |
|---|---|---|---|
| 6,286,104 B1 * | 9/2001 | Buhle et al. .................... 726/4 |
| 2003/0046298 A1 * | 3/2003 | Weedon ....................... 707/102 |
| 2007/0016617 A1 * | 1/2007 | Lomet .......................... 707/200 |
| 2007/0285993 A1 * | 12/2007 | Bindewald et al. ...... 365/189.05 |
| 2009/0064272 A1 * | 3/2009 | Goldszmidt et al. ............ 726/1 |

* cited by examiner

*Primary Examiner* — Timothy A Mudrick
(74) *Attorney, Agent, or Firm* — Park, Vaughan, Fleming & Dowler LLP

(57) ABSTRACT

One embodiment of the present invention provides a system for implementing a persistence application programming interface (API) that is platform independent and can make up-calls to business logic. During operation, the system receives a request at the API to execute a command at a persistence tier of an n-tier distributed application. In response to the request, the system determines an entity type for an entity affected by the command. Next, the system identifies a function at a middle tier of the n-tier distributed application that is associated with the entity type and the command, wherein the middle tier includes the business logic. The system then sends an instruction to the middle tier to execute the function. Finally, upon receiving a confirmation at the API that the function executed, the system executes the command at the persistence tier.

20 Claims, 3 Drawing Sheets

METHOD AND APPARATUS FOR FACILITATING A PERSISTENCE APPLICATION PROGRAMMING INTERFACE

BACKGROUND

Related Art

In order to improve performance and scalability, many web-based applications are built using a multi-tier architecture, wherein the web-based application is spread across multiple servers or clusters (tiers) that provide different types of functionality. For example, a typical web-based application may be comprised of three distinct and independent tiers: a presentation tier that serves as a front-end for the application, which acts as an intermediary between the users and the web-based application; a business tier, or middle tier, that includes all of the business logic of the web-based application; and a persistence tier that includes a database or other storage system or device. Each tier executes independently of the other tiers, and can be replaced or upgraded without adversely affecting the other tiers.

Despite the many advantages of multi-tier web applications, these web-applications have a few problems. For example, in many environments, each tier is maintained by different groups that have little or no knowledge of the other tiers. For instance, the application programmers that create the business logic typically do not know about the implementation details of the persistence tier. Furthermore, database administrators typically do not know much about the business logic. This can be problematic when a complex operation involves multiple interactions between the tiers. For example, if an update to a record in a database triggers a secondary update to a second table, the secondary update to the second table may need to be checked by the business logic to make sure that the secondary update is in compliance with the defined business constraints and rules. In this example, the persistence tier would have to send the secondary update back to the middle tier (an "up-call") so that the middle tier can perform this check.

In some multi-tier applications, special triggers or stored procedures are implemented at the persistence tier to make these up-calls to the business tier when necessary. However, these implementations involve a blurring of the tier boundaries, and can tie an organization to a specific implementation or persistence-tier provider.

SUMMARY

One embodiment of the present invention provides a system for implementing a persistence application programming interface (API) that is platform independent and can make up-calls to business logic. During operation, the system receives a request at the API to execute a command at a persistence tier of an n-tier distributed application. In response to the request, the system determines an entity type for an entity affected by the command. Next, the system identifies a function at a middle tier of the n-tier distributed application that is associated with the entity type and the command, wherein the middle tier includes the business logic. The system then sends an instruction to the middle tier to execute the function. Finally, upon receiving a confirmation at the API that the function executed, the system executes the command at the persistence tier.

In some embodiments of the present invention, when the system sends the instruction to the middle tier to execute the function, the system also sends the command to the middle tier, wherein a portion of the command is used as a parameter for the function.

In some embodiments of the present invention, the system receives a second request from the middle tier at the API to execute a second command at the persistence tier.

In some embodiments of the present invention, in response to the second request, the system determines a second entity type for a second entity affected by the second command. Next, the system identifies a second function at the middle tier of the n-tier distributed application that is associated with the second entity type and the second command. The system then sends a second instruction to the middle tier to execute the second function. Finally, upon receiving a second confirmation at the API that the second function executed, the system executes the second command at the persistence tier.

In some embodiments of the present invention, the system creates a transaction at the API that includes at least one of the instruction and the command. Next, the system determines if the function executed successfully at the middle tier and the command executed successfully at the persistence layer. If so, the system commits the transaction. However, if not, the system rolls-back the transaction.

In some embodiments of the present invention, the system creates the transaction by creating a persistence tier sub-transaction at the persistence tier. Note that committing the transaction involves committing the persistence tier sub-transaction, and rolling-back the transaction involves rolling-back the persistence tier sub-transaction.

In some embodiments of the present invention, the persistence tier includes a relational database.

In some embodiments of the present invention, prior to identifying the function at the middle tier of the n-tier distributed application, the system receives a registration at the API that identifies the function and the associated entity type and command.

In some embodiments of the present invention, the steps of identifying the function at the middle tier and sending the instruction to the middle tier are handled by an Orchestration Delegate, wherein the Orchestration Delegate orders the execution of code previously registered with the API when a registration condition is satisfied.

DETAILED DESCRIPTION

Figure 1:
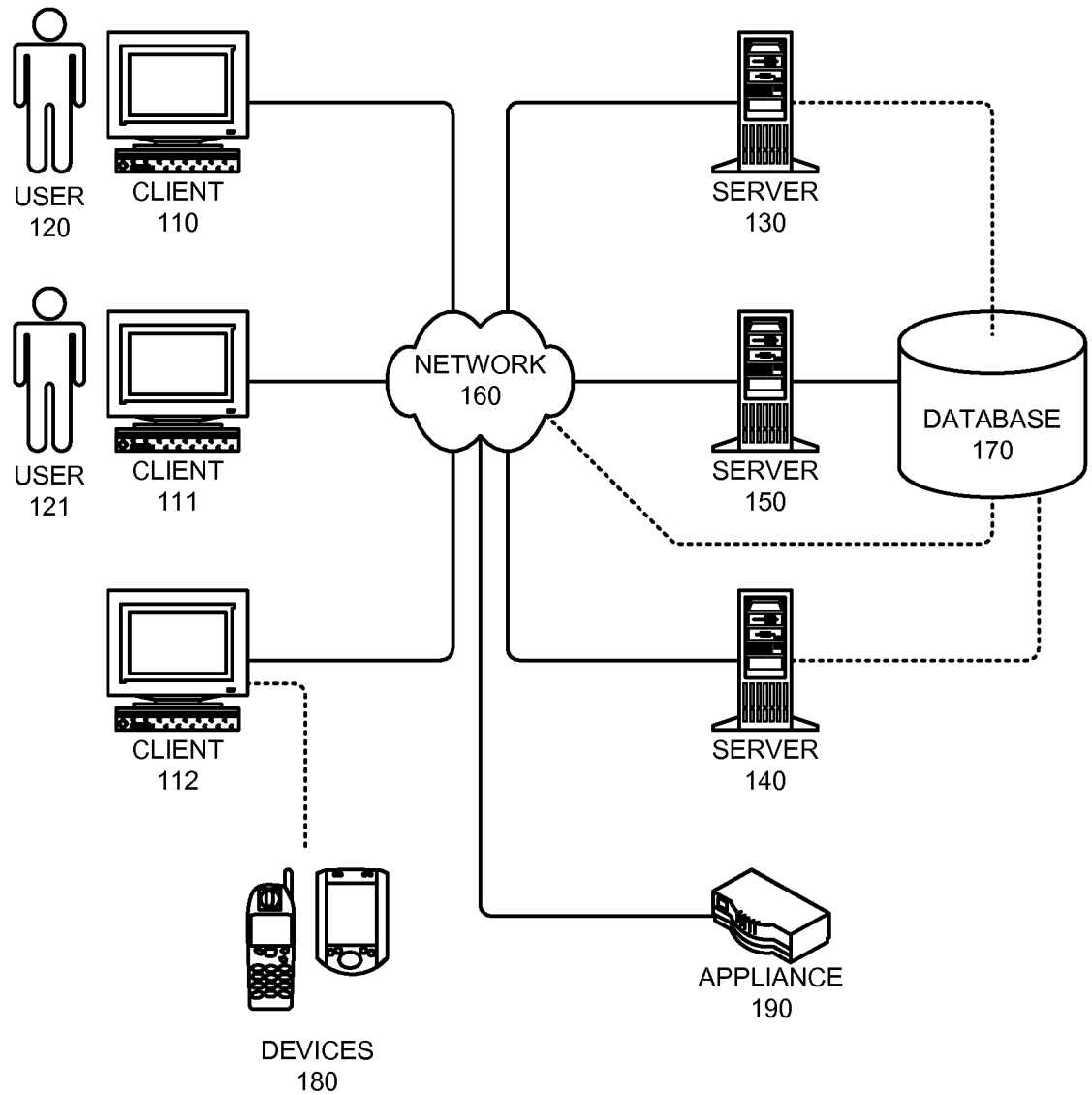
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system for implementing a persistence application programming interface (API) that is platform independent and can make up-calls to business logic. During operation, the system receives a request at the API to execute a command at a persistence tier of an n-tier distributed application. In response to the request, the system determines an entity type for an entity affected by the command. Next, the system identifies a function at a middle tier of the n-tier distributed application that is associated with the entity type and the command, wherein the middle tier includes the business logic. The system then sends an instruction to the middle tier to execute the function. Finally, upon receiving a confirmation at the API that the function executed, the system executes the command at the persistence tier.

For example, all calls to the persistence layer can be handled by the persistence API. The persistence API enables the web-based application to save data to the database, and, when doing so, executes business logic that checks validity, performs bookkeeping, etc. The persistence API makes it possible to call middle-tier logic from the persistence tier, which is actually an up-call from a lower layer to a higher layer. These up-calls are made without the programmer who writes the middle-tier code having any knowledge about the implementation of the persistence tier. Note that the persistence tier API enables the middle-tier logic to not have to know about the persistence details. In addition, the persistence API enables the web-based application to remain portable across databases, object-relational (OR)-mappers, languages (such as Java™ and C#®), and platforms (such as Windows® and Unix®).

In some embodiments of the present invention, when the system sends the instruction to the middle tier to execute the function, the system also sends the command to the middle tier, wherein a portion of the command is used as a parameter for the function.

In some embodiments of the present invention, the system receives a second request from the middle tier at the API to execute a second command at the persistence tier. Note that while the middle tier is executing code associated with the command, the middle tier can send additional requests to the persistence API. Furthermore, each of these additional requests can, in turn, result in even more additional requests.

In some embodiments of the present invention, in response to the second request, the system determines a second entity type for a second entity affected by the second command. Next, the system identifies a second function at the middle tier of the n-tier distributed application that is associated with the second entity type and the second command. The system then sends a second instruction to the middle tier to execute the second function. Finally, upon receiving a second confirmation at the API that the second function executed, the system executes the second command at the persistence tier.

In some embodiments of the present invention, the system creates a transaction at the API that includes at least one of the instruction and the command. Next, the system determines if the function executed successfully at the middle tier and the command executed successfully at the persistence layer. If so, the system commits the transaction. However, if not, the system rolls-back the transaction. Note that the transactions are created, committed, and rolled-back from the persistence API.

In some embodiments of the present invention, the system creates the transaction by creating a persistence tier sub-transaction at the persistence tier. Note that committing the transaction involves committing the persistence tier sub-transaction, and rolling-back the transaction involves rolling-back the persistence tier sub-transaction. In these embodiments, the persistence API leverages the existing transaction framework of the database.

In some embodiments of the present invention, the persistence tier includes a relational database. Note that while many embodiments of the present invention use a relational database, in general any type of data storage may be used. In some embodiments, this may include an XML-based file management system.

In some embodiments of the present invention, prior to identifying the function at the middle tier of the n-tier distributed application, the system receives a registration at the API that identifies the function and the associated entity type and command. Note that a programmer only needs to register a specific function with the associated entity type and command, and does not need to know anything else about the persistence tier.

For example, the programmer can register a specific function that applies business rules for the addition of a new customer when the API receives a command that enters a new record into a customer table.

In some embodiments of the present invention, the steps of identifying the function at the middle tier and sending the instruction to the middle tier are handled by an Orchestration Delegate, wherein the Orchestration Delegate orders the execution of code previously registered with the API when a registration condition is satisfied.

Note that the Orchestration Delegate actively dispatches these instructions to the middle tier as the commands are executed at the API. Alternatively, the system could use a registration model in lieu of the Orchestration Delegate wherein the functions at the middle tier are configured to listen for specific events at the API.

In one embodiment of the present invention, an API called "the Repository" is the public API for all persistence operations. The implementation of this API: analyzes the incoming graph of Entities and ordinary objects; determines which items are new and which items are updates to existing items; swaps composition children for composition parents; enforces constraints; and calls a logic delegate that performs the actual persistence operations (create, read, update, and delete). The logic delegate also calls middle-tier logic, which is implemented as one or more Orchestration atoms that are registered with the system. The middle-tier logic can perform arbitrarily complex operations, including making additional calls to the Repository. The Repository also takes care of starting, committing, and rolling back transactions.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

For example, in one embodiment of the present invention, user 120 uses client 110 to access an n-tier web-based application that is hosted on servers 140 and 150, and database 170. In this embodiment, server 140 serves as the presentation tier, and handles all interactions with user 120 and client 110. Additionally, server 150 comprises the business tier or middle tier, and includes all of the business logic. Finally, database 170 comprises the persistence tier and provides the data storage for the web-based application.

Apparatus

Figure 2:
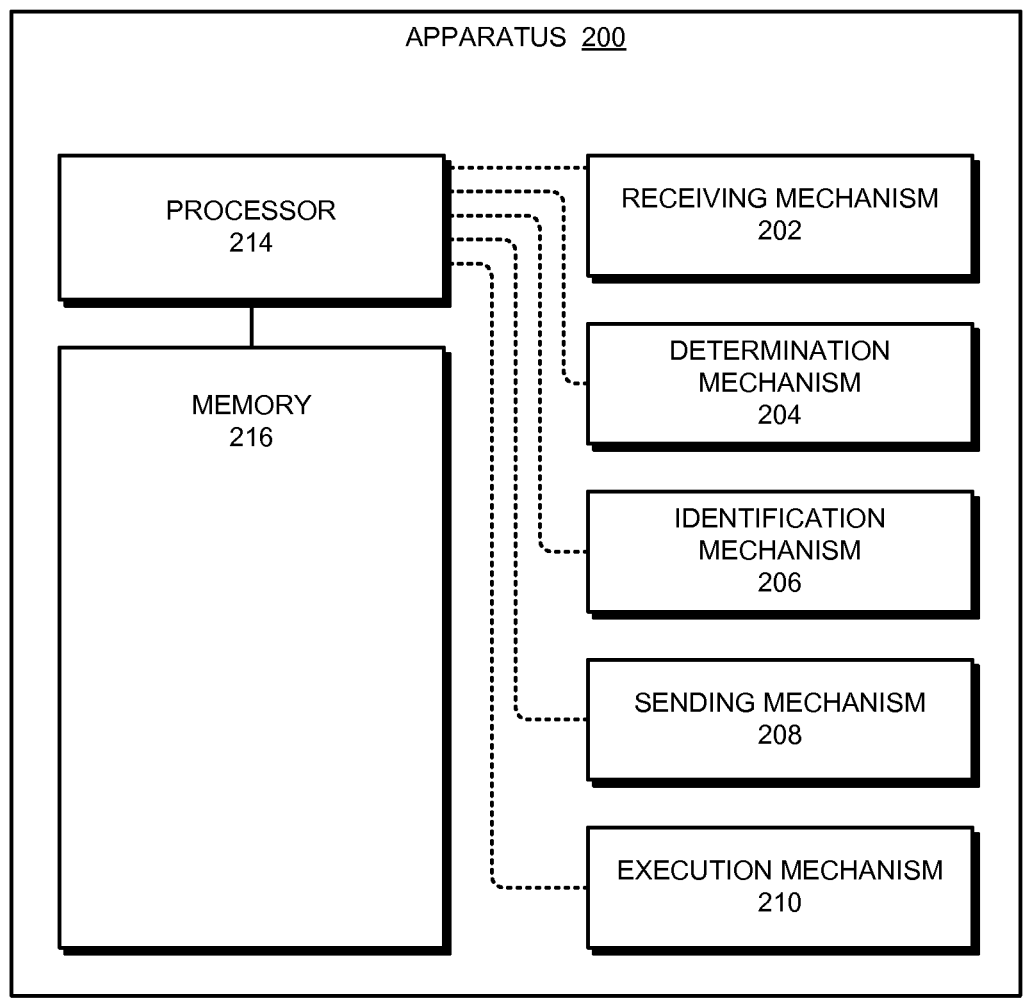
FIG. 2 illustrates an apparatus in accordance with an embodiment of the present invention.
Figure 3:
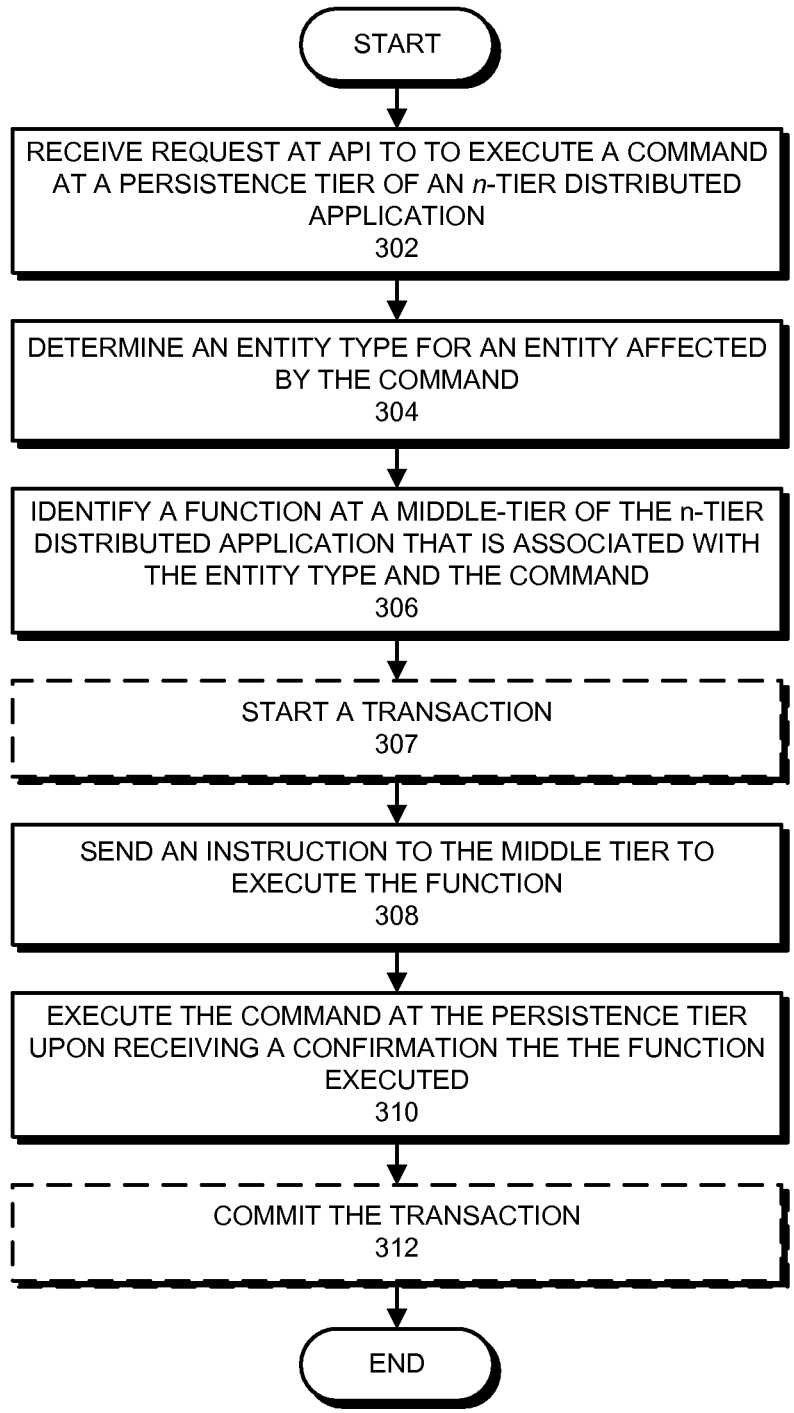
FIG. 3 presents an associated flow chart illustrating the process of facilitating a persistence application programming interface (API) that is platform independent and can make up-calls to business logic in accordance with an embodiment of the present invention.

FIG. 2 illustrates an apparatus 200, and FIG. 3 presents an associated flow chart illustrating the process of facilitating a persistence application programming interface (API) that is platform independent and can make up-calls to business logic in accordance with an embodiment of the present invention.

Apparatus 200, which, for example, can comprise server 150, database 170, appliance 190, client 110, devices 180, or any combination thereof, includes receiving mechanism 202, determination mechanism 204, identification mechanism 206, sending mechanism 208, execution mechanism 210, processor 214, and memory 216.

During operation, receiving mechanism 202 receives a request at the API to execute a command at a persistence tier of an n-tier distributed application (operation 302). Next, determination mechanism 204 determines an entity type for an entity affected by the command in response to the request (operation 304). For example, the command could include an update to an employee record to adjust the employee's salary. In this example, the entity type would be the employee table.

Identification mechanism 206 then identifies a function at a middle tier of the n-tier distributed application that is associated with the entity type and the command (operation 306), wherein the middle tier includes the business logic. For example, the function might check that the salary is within an allowed range and that the person issuing the command has sufficient rights to do so.

At this point, the API may optionally start a transaction (operation 307). In some embodiments of the present invention, as described previously, the API may leverage an existing transaction system that is part of database 170.

Next, sending mechanism 208 sends an instruction to the middle tier to execute the function (operation 308). Upon receiving a confirmation at the API that the function executed, execution mechanism 210 executes the command at the persistence tier (operation 310). Finally, if the API previously started a transaction, and if the function and the command executed successfully, the API commits the transaction (operation 312).

Exemplary Embodiment

The following section describes one embodiment of the present invention for exemplary purposes only. Note that the present invention is not meant to be limited to the details described in this embodiment.

This embodiment provides a system where persistence of objects is controlled by an Entity Service API, wherein the Entity Service calls Hibernate to perform CRUD (Create, Read, Update, Delete) operations.

Note that Hibernate takes care of determining what to create, update, and delete, by using its internal mechanism for detecting dirty objects and for implementing persistence-by-reachability (where it automatically determines what needs to accomplished to CRUD the elements in an entire object graph, or set of object graphs).

Repository, the public API for Extensible Data Access and layer of abstraction above Entity Service, does not call Entity Service directly for create, update, or delete operations. Instead, Repository performs creates, updates, and deletes by calling create, update, and delete CRUD Orchestrations.

Note that CRUD Orchestrations are implementations of the ICrudDelegate interface, which is defined in the Repository project.

The CRUD Orchestration Delegate interface is very simple, and looks like this:

```
public interface ICrudDelegate
{
    public Entity[ ] create(Entity[ ] entities);
    public Entity[ ] update(Entity[ ] entities);
    public void delete(Entity[ ] entities);
}
```

During system startup, a CRUD Orchestration Delegate implementation is delegated into Repository by Orchestration initialization code. When Repository operations are invoked, Repository checks to see if there is a CRUD Orchestration Delegate in Repository. If there is no CRUD Orchestration Delegate, Repository performs CRUD operations without executing Orchestrations. However, if there is a CRUD Orchestration Delegate, Repository works with the CRUD Orchestration Delegate to correctly execute validation logic, other business logic, and CRUD operations.

For composition relations, the system can let Hibernate persist the object graph. The system can do this because the system only defines CRUD Orchestrations for composition parents.

For associations to Data Objects, and for hash maps of Data Types, the system lets Hibernate persist the graph. The system can do this because CRUD Orchestrations are never defined for Data Objects or Data Types. However, for associations among Entities, the system defines CRUD Orchestrations for both ends of the association, and executes both CRUD Orchestrations. Note that this requires coordination of CRUD Orchestration executions and operations performed by Hibernate for cascading persistence to associations.

The following discussion describes the details of how the Repository manages execution of CRUD Orchestrations and Hibernate persistence for object graph closures of Entities presented to save and delete APIs.

Requirements and Use Cases

First, the system can ideally provide an API that has intuitive behavior, is easy to use, and produces correct results. This is the top-level requirement. Everything else listed in this section is intended to satisfy this requirement for clients of the Repository API. For example, clients of the API can do the following:

1. Create a new Customer Entity by saving an Invoice (new or previously saved) that points to a new Customer Entity.
2. Update a previously saved Customer Entity by changing it in memory, associating to it from an Invoice, and saving the Invoice.
3. Update a previously saved Customer Entity that is already associated with an Invoice by changing the Customer Entity in memory, and saving the Invoice.

The system can also run an entire set of operations under one transaction. Repository needs to start a transaction at the beginning of a call to a Repository operation (for example, save), and commit that transaction at the end of the call. If anything goes wrong at any point during the operation, Repository needs to rollback the entire transaction.

The system can also remove duplicate entities before submitting arrays to the CRUD Orchestration Delegate. In non-trivial graphs of Entities and Data Objects, it is possible (in fact, likely) that the same Entity will be reachable by more than one path through the graph. For example, two different Invoice Entities could point to the same Customer Entity.

To avoid redundant invocations of Orchestration logic, Repository can remove all duplicates from all arrays before submitting them to the CRUD Orchestration Delegate, so that each distinct Entity is seen exactly once by the Orchestration engine.

The system can be configured to submit only new entities to create orchestrations. Arrays submitted to the CRUD Orchestration Delegate create method should only contain new Entities (Entities that have never been saved to the database before).

The system should submit only previously saved Entities that are currently dirty to update orchestrations Note that arrays submitted to the CRUD Orchestration Delegate update method should only contain Entities that have been saved to the database before and are now dirty. An Entity is dirty if any of its simple Properties have changed, or if any of its 1:1 relations have changed from not-null to null (assuming they are nullable) or from null to not-null, or if any of its collection relations have had elements added or deleted.

For example, if a unidirectional association no longer exists between a source Entity and a target Entity, Repository can submit the source Entity to the CRUD Orchestration Delegate to update. Similarly, if a bidirectional association no longer exists between two Entities, Repository can submit both Entities to the CRUD Orchestration Delegate to update. Note that this implies that relations (1:1 and multiple) should track added and deleted elements.

The system should submit only previously saved Entities to delete orchestrations. Moreover, arrays submitted to the CRUD Orchestration Delegate delete method should only contain Entities that have been saved to the database before. An Entity can be deleted for one of two reasons:

1. The API client specifically calls Repository delete on the Entity.
2. The Entity is a composition child that is removed from a composition relation (1:1 or multiple), and the composition parent is saved, which needs to trigger delete on the removed Entity.

The system can execute CRUD Orchestrations defined along an inheritance path for an entity. For example, Entity classes can be subclasses of other Entity classes, to any depth specified by the modeler. When CRUD is performed on an Entity that has parent classes in its inheritance path, CRUD Orchestrations defined for the parent classes can be run on the Entity. In other words, Orchestrations can execute polymorphically.

Note that Repository cannot implement this requirement, because it has no parent Entity instances to pass into the CRUD Orchestration Delegate. Instead, this requirement can be implemented entirely inside the Orchestration CRUD Orchestration Delegate, by walking along the inheritance path and running the Orchestrations defined for every Entity class in the path.

The system can also prevent deletes of new Entities. When Repository delete is called on a new Entity, it can throw an exception. (Note that this is already taken care of by Entity Service.)

The system can submit extended Entities instead of extensions to CRUD Orchestration Delegate. When a CRUD operation is performed on an Extension, Repository can replace the Extension with the Entity it extends, and submit the extended Entity to the CRUD Orchestration Delegate instead of giving it the original Extension. There are two reasons for this requirement:

1. An Extension may be one of n Extensions of a particular Entity. In order for CRUD Orchestrations to execute correctly, they should execute not just on the Extension, but also on the extended Entity, and on all other Extensions of the extended Entity. By flipping the Extension to the Entity it extends before invoking the CRUD Orchestration Delegate, all of the Orchestrations are executed correctly. Note that this requires Orchestration Extension to work properly.
2. In Composites, the Orchestrations associated with the extended Entity can be overridden, but this will not work correctly unless the extended Entity, instead of the Extension, is passed into the CRUD Orchestration Delegate.

The system should also submit only composition parent entities to the CRUD Orchestration Delegate. When Repository save or delete is called on a composition child Entity that is new or dirty, Repository should replace the child Entity with the parent Entity, and submit the parent Entity to the CRUD Orchestration Delegate instead of giving it the child Entity. If the parent Entity is new, Repository can submit the parent Entity to the CRUD Orchestration Delegate to create. If the parent Entity is not new, Repository can submit the parent Entity to the CRUD Orchestration Delegate to update.

If the Entity that owns the child Entity is itself a child in a composition relation, Repository can give the parent of the parent to the CRUD Orchestration Delegate, instead of giving it the parent, and so forth until the transitive closure of composition relations is exhausted upwards. Only the ultimate parent of a chain of compositions should be given to the CRUD Orchestration Delegate to update or create.

For example, if As own Bs and Bs own Cs, there should only be an Orchestration defined for As, and that Orchestration needs to take care of whatever business logic is needed for both Bs and Cs.

Note that this requirement encompasses the previous requirement about Extensions, because Extensions are mapped as bidirectional 1:1 compositions, with the Extension as the child. However, it is important to specifically call out the Extension case, because of the sub-requirement that Orchestrations should run on all of the Extensions of the extended Entity.

Execute CRUD Orchestrations Following Persistence of Root Entity

This section encapsulates a revised approach for execution of CRUD Orchestrations as part of Repository persistence operations. The initial design path for driving automatic CRUD Orchestrations of Entity objects, supplied to Repository save and delete operations, involved collecting all candidate Entity objects from graph closures of supplied objects and passing them to the CRUD Orchestration Delegate in batches of homogeneous Entity types where both Entity Service persistence operations and CRUD Orchestrations would be performed.

Tightly coupling Entity persistence and CRUD Orchestrations works well for each Entity object passed to Repository save and delete methods. However, it presents challenges when attempting to perform CRUD Orchestrations for Entities indirectly persisted as part of the object graph closure of an Entity passed to the Repository in a save or delete operation. An Entity destined for implicit persistence can be easily identified from the object graph closure an input Entity. The issue is how to pass such an Entity to the CRUD Orchestration Delegate, where both CRUD Orchestrations and persistence are performed without raising conflicts in the persistence layer. For example, saving a new Entity found in the object graph closure of an Entity passed to Repository.save(T) will produce an exception if already persisted as part of saving the input Entity.

Rather than introducing constraints on persistence configuration or imposing restrictions on the extent of automatic CRUD Orchestrations allowed, an alternative plan maximizes execution of automatic CRUD Orchestrations for all Entities impacted by Repository save and delete operations. The idea is to process Entities in two steps with only a single Entity passed to the CRUD Orchestration Delegate at any given time. First, the system performs persistence and CRUD Orchestrations for each Entity supplied to the Repository operation. Actually, the Entity passed to the CRUD Orchestration Delegate may, in fact, be the composition root parent if supplied Entity is a composition child, or the extended Entity of a supplied Entity extension. The Entity forwarded to the CRUD Orchestration Delegate in this step can be called the "root Entity." Note that the root Entity is persisted and registered CRUD Orchestrations are executed.

At this point, CRUD Orchestrations for those Entities persisted indirectly have not been performed and are outstanding. Keep in mind that they are persisted as part of root Entity persistence. The second step involves sending each of those Entities to the CRUD Orchestration Delegate. In doing so, the Entities have CRUD Orchestrations fired and are passed to the persistence manager, for a second time. In cases where an existing Entity was already updated and is now being updated again, Hibernate will merge update requests as one within the same transaction. Essentially a second save becomes a no-op. Persistence conflicts could still arise, such as the case where a new Entity was indirectly persisted earlier as part of a root Entity save operation. Recognizing various types of conflicts with persistence of an Entity already persisted and coding around them enables greater coverage for automatic CRUD Orchestrations.

New Entities in the object graph closure of a root Entity, already persisted when root Entity is saved, should not be presented to the persistence layer again in the same transaction. Within the CRUD Orchestration Delegate, an Entity can be examined for the value of isNew( ). If the value is true and the Entity also has an ID value (indicating instance was created in an earlier save) it has had CRUD Orchestrations executed, and is not persisted again.

In Repository save and delete operations that supply an input array of Entities, it may be possible for duplicate instances to appear either explicitly in the array elements or implicitly in the object graph closures of Entities in the array. Unless handled, duplicate instances can result in multiple executions of CRUD Orchestrations for the same Entity. The Repository identifies duplicate Entities and throws an exception when encountered to help caller to supply Entities without duplicates to Repository Deleting associated Entities in the object graph closure of a root Entity may break the semantics of relationship. For example, a delete of an Invoice should not result in removal of the Customer associated with it. The Repository will only delete the root Entity and therefore only run CRUD (i.e., delete) Orchestrations on it. This means that Entities removed or updated in the object graph closure of root Entity following delete of the root Entity will not have CRUD Orchestrations run.

A delete operation called upon a composition child should throw an exception. The Repository would flip the child to its root parent and invoke a delete on it, resulting in removal of the parent and all its children. This should not be the intention of caller. If a child should be deleted, the parent should be modified with removal of designated child and then saved.

A new composition child sent to the Repository save operation should be the only new child of a parent Entity. It is not possible to determine the appropriate child Entity when more than one new child Entity is being created under the same parent. InvalidOperationException is thrown should this situation arise.

Visitor

A visitor can be implemented to identify new or updated Entities in object graph closure of an Entity passed to Repository save and delete methods. The visitor implements IEntityVisitor. For both saves and deletes, the visitor can:
1. Provide a way to toggle between save and delete modes.
2. Traverse the entire object graph that is passed into the save(Entity)/delete(Entity) methods, and the entire array of entire object graphs that is passed into the save (Entity[ ])/delete(Entity[ ] methods, while performing cycle detection to avoid visiting any node more than once (already part of the visitor implementation in EntityCommon).
3. Analyze the nodes in the object graph(s) to identify and collect Entities that should be passed to the CRUD Orchestration Delegate.

On saves, the visitor will:
1. Set the unique ID in every Entity in which it is not already set, except for Entities that are Extensions.
2. Put new Entities in create arrays specific to each exact type of Entity.
3. Put previously saved, currently dirty Entities in update arrays specific to each exact type of Entity.
4. Make certain each Entity appears only once in the entire set of arrays.
5. Replace Extensions with what they extend.
6. Replace composition child Entities with their parent Entities, transitively, until reaching the ultimate parents.
7. Make available to Repository the arrays Entities collected.

On deletes, the visitor can determine if any Entity in the object graph closure is new, enabling the Repository to throw an exception. Note that the Entity Service already does this, but it is wasteful to send an entire graph to the server if the system can catch the error earlier.

Repository Behavior

When Repository save is called, Repository can:
1. Start a transaction.
2. Create a visitor and put it in save mode.
3. Execute the visitor on input Entity or Entities.
4. Flip root Entity identified as an Extension to extended Entity.
5. Flip root Entity identified as a composition child to root composition parent.
6. Submit root Entity to the CRUD Orchestration Delegate update or create method.
7. Submit each Entity identified by the visitor to CRUD Orchestration Delegate update or create method.
8. Commit the transaction to complete persistence of Entities to the database.
9. Return saved Entity/Entities to caller.

When Repository delete is called, Repository can:
1. Start a transaction.
2. Create a visitor and put it in delete mode.
3. Execute visitor on root Entity to throw an exception if new Entities are found in object graph closure.
4. For delete(Entity[ ]), throw an exception if duplicate Entities found in object graph closures.
5. Submit root Entity to the CRUD Orchestration Delegate delete method.
6. Commit the transaction.

Exceptions

A number of new error situations are identified by the Repository in processing input Entities for save and delete operations. In each case InvalidOperationException is thrown. The exception is caught by the Repository in order to roll back transaction originally initiated for save or delete operation. Note that Exception details:
1. A new Entity was supplied to delete operation.
2. A composition child with no composition parent instance was found in object graph closure of an Entity supplied to save operation.
3. A composition child was supplied to delete operation. Given the Repository always flips to the parent, a delete of the parent is not appropriate.
4. Multiple occurrences of same Entity instance found in object graph closure of Entity or Entities supplied to save operation.
5. No resolved Entity was found in object graph closure of an Entity supplied to save operation.
6. Unable to return a saved object corresponding to an Entity supplied to a save operation.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for implementing a persistence application programming interface (API) that is platform independent and can make up-calls to business logic, the method comprising:
receiving a request at the API to execute a command at a persistence tier of an n-tier distributed application;
in response to the request, determining an entity type for an entity affected by the command;
identifying a function at a middle tier of the n-tier distributed application that is associated with the entity type and the command, wherein the middle tier includes the business logic;
sending an instruction from the API at the persistence tier to the middle tier to execute the function, wherein the instruction specifies the function, and wherein the function already exists at the middle tier, whereby the persistence tier is directing the execution of the function at the middle tier by making an up-call to the middle tier; and
upon receiving a confirmation at the API that the function executed, executing the command at the persistence tier.

2. The method of claim 1, wherein sending the instruction to the middle tier further involves sending the command to the middle tier, wherein a portion of the command is used as a parameter for the function.

3. The method of claim 1, further comprising receiving a second request from the middle tier at the API to execute a second command at the persistence tier.

4. The method of claim 3, further comprising:
in response to the second request, determining a second entity type for a second entity affected by the second command;
identifying a second function at the middle tier of the n-tier distributed application that is associated with the second entity type and the second command;
sending a second instruction to the middle tier to execute the second function; and
upon receiving a second confirmation at the API that the second function executed, executing the second command at the persistence tier.

5. The method of claim 1, further comprising:
creating a transaction at the API that includes at least one of the instruction and the command;
determining if the function executed successfully at the middle tier and the command executed successfully at the persistence layer;
if so, committing the transaction; and
if not, rolling-back the transaction.

6. The method of claim 5, wherein creating the transaction involves creating a persistence tier sub-transaction at the persistence tier, wherein committing the transaction involves committing the persistence tier sub-transaction, and wherein rolling-back the transaction involves rolling-back the persistence tier sub-transaction.

7. The method of claim 1, wherein the persistence tier includes a relational database.

8. The method of claim 1, wherein prior to identifying the function at the middle tier of the n-tier distributed application, the method further comprises receiving a registration at the API that identifies the function and the associated entity type and command.

9. The method of claim 1, wherein the steps of identifying the function at the middle tier and sending the instruction to the middle tier are handled by an Orchestration Delegate, wherein the Orchestration Delegate orders the execution of code previously registered with the API when a registration condition is satisfied.

10. A non-transitory computer-readable storage medium storing instructions that when executed by a computer cause the computer to perform a method for implementing a persistence application programming interface (API) that is platform independent and can make up-calls to business logic, the method comprising:
receiving a request at the API to execute a command at a persistence tier of an n-tier distributed application;
in response to the request, determining an entity type for an entity affected by the command;
identifying a function at a middle tier of the n-tier distributed application that is associated with the entity type and the command, wherein the middle tier includes the business logic;
sending an instruction from the API at the persistence tier to the middle tier to execute the function, wherein the instruction specifies the function, and wherein the function already exists at the middle tier, whereby the persistence tier is directing the execution of the function at the middle tier by making an up-call to the middle tier; and
upon receiving a confirmation at the API that the function executed, executing the command at the persistence tier.

11. The non-transitory computer-readable storage medium of claim 10, wherein sending the instruction to the middle tier further involves sending the command to the middle tier, wherein a portion of the command is used as a parameter for the function.

12. The non-transitory computer-readable storage medium of claim 10, wherein the method further comprises receiving a second request from the middle tier at the API to execute a second command at the persistence tier.

13. The non-transitory computer-readable storage medium of claim 12, wherein the method further comprises:
in response to the second request, determining a second entity type for a second entity affected by the second command;
identifying a second function at the middle tier of the n-tier distributed application that is associated with the second entity type and the second command;
sending a second instruction to the middle tier to execute the second function; and
upon receiving a second confirmation at the API that the second function executed, executing the second command at the persistence tier.

14. The non-transitory computer-readable storage medium of claim 10, wherein the method further comprises:
creating a transaction at the API that includes at least one of the instruction and the command;
determining if the function executed successfully at the middle tier and the command executed successfully at the persistence layer;
if so, committing the transaction; and
if not, rolling-back the transaction.

15. The non-transitory computer-readable storage medium of claim 14, wherein creating the transaction involves creating a persistence tier sub-transaction at the persistence tier, wherein committing the transaction involves committing the persistence tier sub-transaction, and wherein rolling-back the transaction involves rolling-back the persistence tier sub-transaction.

16. The non-transitory computer-readable storage medium of claim 10, wherein the persistence tier includes a relational database.

17. The non-transitory computer-readable storage medium of claim 10, wherein prior to identifying the function at the middle tier of the n-tier distributed application, the method further comprises receiving a registration at the API that identifies the function and the associated entity type and command.

18. The non-transitory computer-readable storage medium of claim 10, wherein the steps of identifying the function at the middle tier and sending the instruction to the middle tier are handled by an Orchestration Delegate, wherein the Orchestration Delegate orders the execution of code previously registered with the API when a registration condition is satisfied.

19. An apparatus configured to implement a persistence application programming interface (API) that is platform independent and can make up-calls to business logic, comprising:
a memory;
a processor;
a receiving mechanism configured to receive a request at the API to execute a command at a persistence tier of an n-tier distributed application;

a determination mechanism configured to determine an entity type for an entity affected by the command in response to the request;

an identification mechanism configured to identify a function at a middle tier of the n-tier distributed application that is associated with the entity type and the command, wherein the middle tier includes the business logic;

a sending mechanism configured to send an instruction from the API at the persistence tier to the middle tier to execute the function, wherein the instruction specifies the function, and wherein the function already exists at the middle tier, whereby the persistence tier is directing the execution of the function at the middle tier by making an up-call to the middle tier; and an execution mechanism configured to execute the command at the persistence tier upon receiving a confirmation at the API that the function executed.

20. The apparatus of claim 19, wherein the sending mechanism is further configured to send the command to the middle tier, wherein a portion of the command is used as a parameter for the function.

* * * * *